United States Patent [19]

Mahaney, Jr. et al.

[11] Patent Number: 4,976,576
[45] Date of Patent: Dec. 11, 1990

[54] CAPTIVE SELF-LOCKING MECHANISM

[75] Inventors: Bernard F. Mahaney, Jr., Kent, Wash.; Carl W. Beck, Peck, Kans.; Kim B. Nixon, Towanda, Kans.; Randolph Connolly, Wichita, Kans.; Terry V. Nunemaker, Rose Hill, Kans.

[73] Assignee: The Boeing Company, Seattle, Wash.

[21] Appl. No.: 159,608

[22] Filed: Feb. 24, 1988

[51] Int. Cl.$^5$ .............................. F16B 39/10
[52] U.S. Cl. .................. 411/121; 411/129; 411/136; 411/941.1
[58] Field of Search ............... 411/116, 117, 119, 120, 411/121, 125-136, 941, 941.1, 979, 980, 982, 985, 987, 995, 107, 533, 999

[56] References Cited

U.S. PATENT DOCUMENTS

| | | | |
|---|---|---|---|
| 71,722 | 12/1867 | Ellsworth | 411/121 |
| 100,159 | 2/1870 | Lamb | 411/128 |
| 249,034 | 11/1881 | Gerrard et al. | 411/127 |
| 434,933 | 8/1890 | Jackman | 411/128 |
| 522,679 | 7/1894 | Siegenthaler | 411/941.1 X |
| 535,913 | 3/1895 | Lantz | 411/130 |
| 542,879 | 7/1895 | Evinof | 411/119 |
| 576,399 | 2/1897 | Froehlich | 411/130 |
| 586,024 | 7/1897 | Gabriel | 411/121 |
| 612,478 | 10/1898 | Bridges | 411/125 |
| 665,011 | 1/1901 | Jarrell | 411/128 |
| 759,039 | 5/1904 | Smith | 411/123 |
| 793,088 | 6/1905 | Pariso | 411/121 |
| 997,095 | 7/1911 | Schmidt | 411/128 |
| 1,084,566 | 1/1914 | Strietelmeier | 411/119 |
| 1,134,792 | 4/1915 | Will | 411/121 |
| 1,198,515 | 9/1916 | Bartley | 411/125 |
| 1,313,589 | 8/1919 | Eaton | 411/130 |
| 1,346,907 | 7/1920 | Munson | 411/120 |
| 1,349,491 | 8/1920 | Burton | 411/136 |
| 1,578,974 | 3/1926 | Ford | 411/125 |
| 1,927,780 | 9/1933 | Anderson | 411/533 X |
| 1,984,244 | 12/1934 | Wilson | 411/128 X |
| 2,179,169 | 11/1939 | Anderson | 411/130 |
| 2,272,178 | 2/1942 | McDowell et al. | 411/999 |
| 3,041,913 | 7/1962 | Liska | 411/999 X |
| 3,389,735 | 6/1968 | Katz | 411/120 |
| 3,866,878 | 2/1975 | Yamamoto | 248/500 |
| 4,830,530 | 5/1989 | Meineke | 292/256.76 X |

FOREIGN PATENT DOCUMENTS

| | | | |
|---|---|---|---|
| 125336 | 6/1949 | Sweden | 411/129 |
| 16527 | of 1902 | United Kingdom | 411/128 |
| 10334 | of 1907 | United Kingdom | 411/125 |
| 204180 | 9/1923 | United Kingdom | 411/128 |

OTHER PUBLICATIONS

Three Photographs of a bolt and nut assembly manufactured by Tridair Corporation.

*Primary Examiner*—Neill R. Wilson
*Assistant Examiner*—Jerry Redman
*Attorney, Agent, or Firm*—Finnegan, Henderson, Farabow, Garrett & Dunner

[57] ABSTRACT

A device for retaining a bolt including a plate having a bore therethrough for receiving the bolt, a retainer movably mounted on the plate and movable between a first position in engagement with a selected number of facets on the bolt head and a second position out of engagement with the facets, the retainer having a surface portion for receiving a tool at times when the tool is placed on the bolt head for moving the retainer to the second position, and a biasing device for urging the retainer to the first position at times when the tool is removed from the bolt head.

17 Claims, 6 Drawing Sheets

CAPTIVE SELF-LOCKING MECHANISM

The U.S. Government has a paid-up license in this invention and the right in limited circumstances to require the patent owner to license others on reasonable terms as provided for by the terms of Contract No. F33657-83-C-0533 awarded by Air Force Logistics Command at Wright-Patterson Air Force Base.

BACKGROUND OF THE INVENTION

1. Field of the Invention

The invention relates to a retaining mechanism for preventing the rotation of a bolt.

2. Description of Related Art

Although a bolt may be fixedly received at its threaded end in an internally threaded bore, the bolt tends to become loosened. For example, vibration or an unintentional striking of the bolt head may cause the bolt to loosen. Thus, devices have been proposed which engage the bolt head to restrict the rotation and resultant loosening of the bolt.

One problem with such proposed devices is that the bolt is often retained by a single lever-type device having only a single contact point with the bolt head. Such a device can be relatively easily overcome by a strong force, thereby permitting the loosening of the bolt.

Another problem with the prior art is that, typically, adjusting the bolt head can only be accomplished by releasing the retaining mechanism with one device and by tightening the bolt head with another device, such as an end wrench, a socket wrench, or the like. Such a retaining mechanism is especially difficult to adjust when it is arranged in a confined area since it is difficult to use several tools simultaneously in such a limited space.

SUMMARY OF THE INVENTION

Accordingly, it is an object of this invention to provide an improved retaining mechanism that overcomes the problems and disadvantages of the above-discussed devices.

It is a further object of the invention is to provide a retaining mechanism that may be adjusted in a confined space.

A still further object of this invention is to provide a retaining mechanism for receiving a bolt which requires only one tool both to release the retaining mechanism and to adjust the bolt.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purposes of the invention, as embodied and broadly described herein, the retaining device of the invention relates to a device for releasably retaining a bolt in engaging relationship with first and second members having coaxial bores, the bolt having a multifaceted head and a threaded portion at opposite ends of a shank, the head of the bolt and the threaded portion of the bolt threadably engaging threads in the bore of the second member, and comprises: a plate having a bore therethrough for receiving the bolt, the bore having an internally threaded portion for threadably engaging the threaded portion of the bolt to prevent an unintentional removal of the bolt from the bore of the plate; a securing device for securing the plate to the first member with the bore of the plate in coaxial relation with the bores in the first and second members; a retainer movably mounted on the plate, the retainer being movable between a first position in engagement with a selected number of the facets for securing the bolt against rotation relative to the plate and a second position out of engagement with the facets for permitting the relative rotation, the retainer having a surface portion positioned to engage a tool at times when the tool is placed on the bolt head for moving the retainer to the second position and at times when the tool is rotated to effect the relative rotation of the bolt; and a biasing mechanism for biasing the retainer to the first position.

The accompanying drawings, which are incorporated in and constitute a part of this specification, illustrate several embodiments of the invention and together with the description, serve to explain the principles of the invention.

DESCRIPTION OF THE PREFERRED EMBODIMENT

Figure 1:
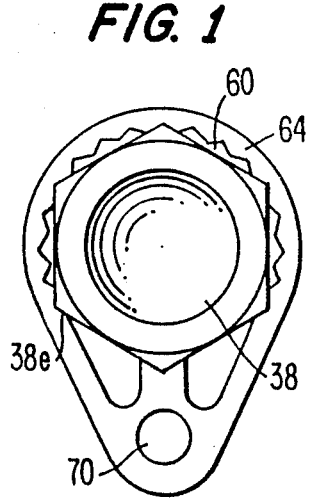
FIG. 1 is a top view of a first preferred embodiment of the invention illustrating the retaining of a six facet bolt.

Reference will now be made in detail to the present preferred embodiments of the invention, examples of which are illustrated in the accompanying drawings.

Generally, the retaining device of the present invention may be used to retain against rotation a bolt having a multifaceted head and a threaded shank. The bolt is adapted to maintain in engagement first and second members having coaxial bores. The bolt head engages the first member and the threaded portion of the bolt threadably engages a threaded bore in the second member.

The bolt may be any type of conventional bolt having a multifaceted head and a threaded shank. For example, the bolt may be a six facet bolt 38 shown in detail in FIGS. 11 and 12, or a twelve facet bolt 40 shown in detail in FIGS. 13 and 14. Referring briefly to FIGS. 11–14, each bolt 38, 40 has a respective shank 38a, 40a with a respective externally threaded portion 38b, 40b, adjacent one end of the shank and a respective bolt head 38c, 40c having a respective multifaceted outer surface 38d, 40d with facets 38e, 40e at an opposite end of the shank.

In accordance with the invention, plate means are provided for receiving the bolt. In the first embodiment, shown in FIGS. 1–4, the plate means includes a plate 56 having a bore 57. In the second embodiment, shown in FIGS. 5–7, the plate means includes a plate 78 having a bore 80. In the third embodiment, shown in FIGS. 8–10, the plate means includes a plate 98 and an integrally-formed cylindrical plate portion 100 having a bore 102 therethrough.

Figure 5:
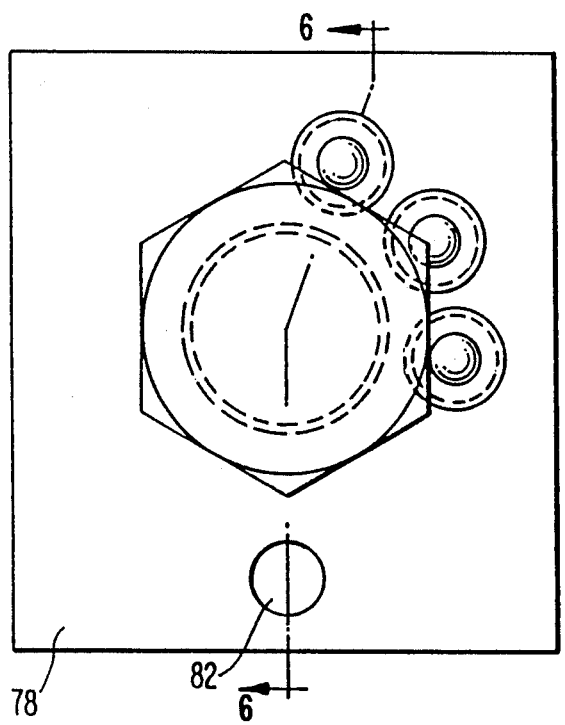
FIG. 5 is a front view of a second preferred embodiment of the invention illustrating retention of a six facet bolt.
Figure 6:
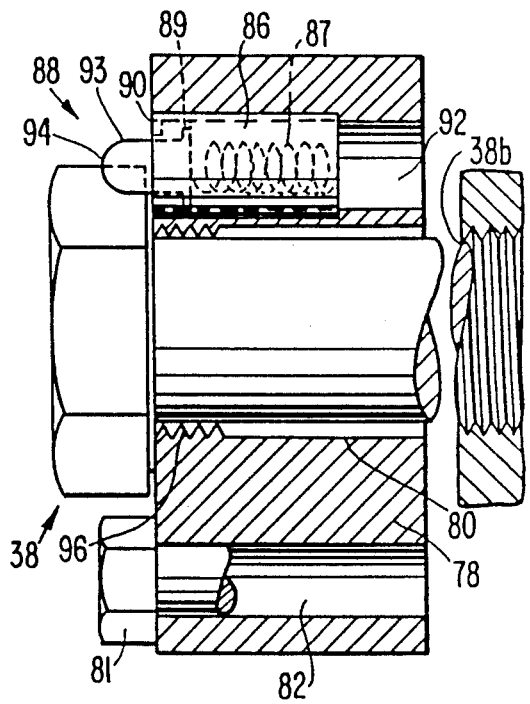
FIG. 6 is a cross-sectional side view taken along line XII—XII of FIG. 5.
Figure 7:
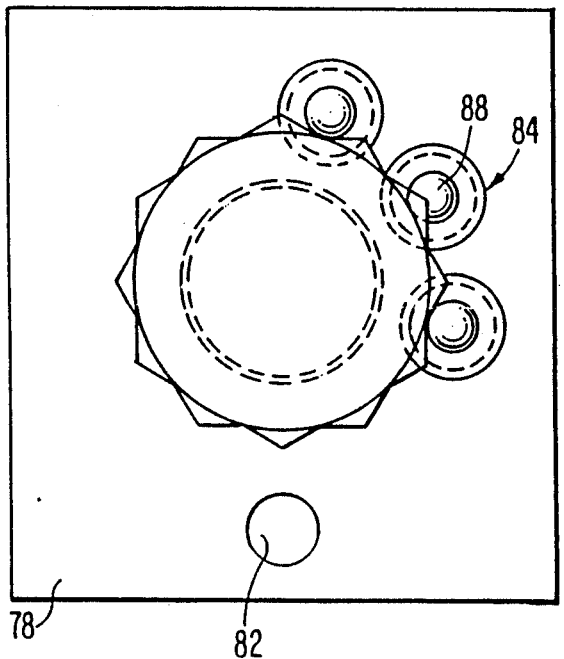
FIG. 7 is a view similar to FIG. 5 illustrating retention of a twelve facet bolt.
Figure 8:
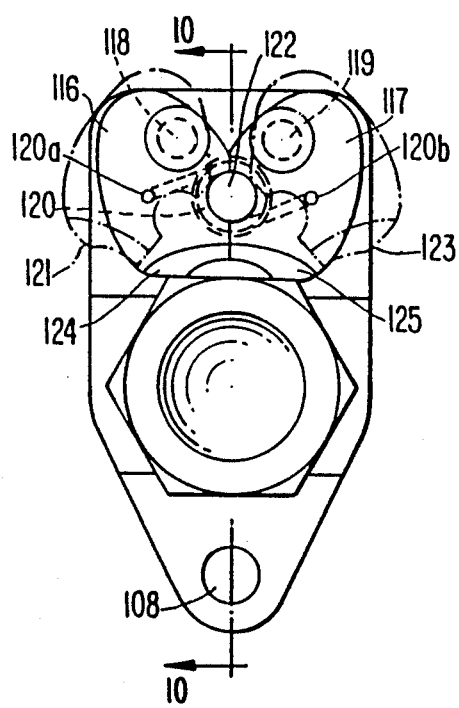
FIG. 8 is a front view of a third preferred embodiment of the invention illustrating the releasing of a six facet bolt.
Figure 9:
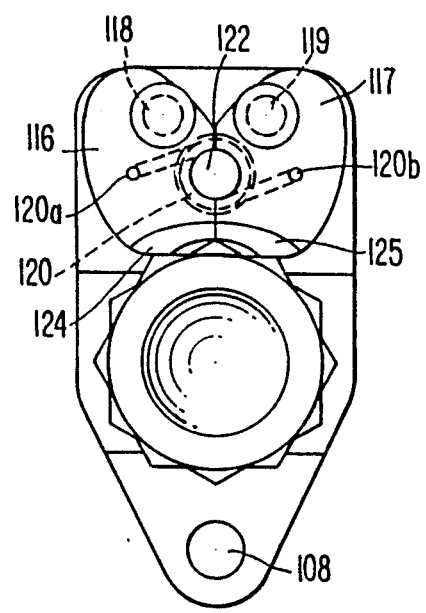
FIG. 9 is a view similar to FIG. 8 illustrating retention of a twelve facet bolt.
Figure 10:
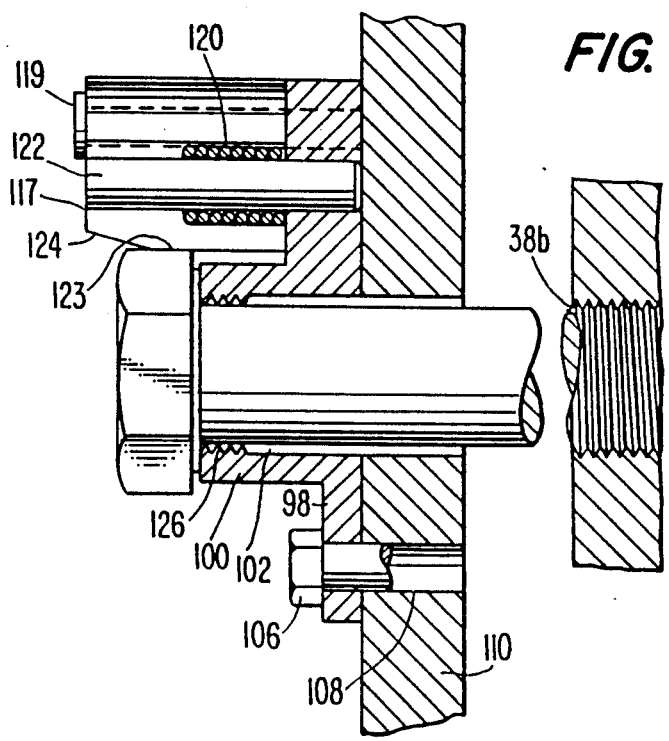
FIG. 10 is a cross-sectional side view of the embodiment of FIG. 8 taken along line XVI—XVI of FIG. 8.
Figure 11:
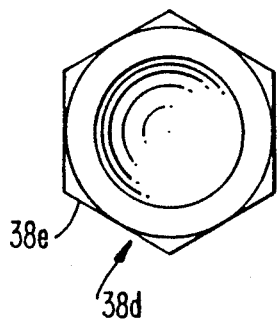
FIG. 11 is a top view of a six facet bolt.
Figure 12:
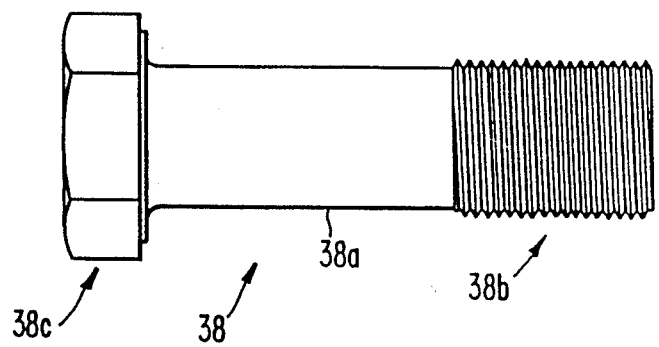
FIG. 12 is a side view of the six facet bolt of FIG. 11.
Figure 13:
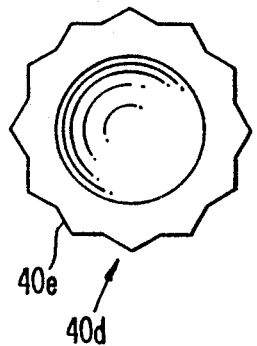
FIG. 13 is a top view of a twelve facet bolt.

In accordance with the invention, the bore of the plate means includes an internally threaded portion for threadably engaging the threaded portion of the bolt. This threaded engagement prevents an unintentional removal of the bolt from the bore of the plate. Referring to FIGS. 1–4, especially FIG. 2, in the first embodiment of the invention threads 76 are provided in the bore 57 of the plate 56. Referring to FIGS. 5–7, especially FIG. 6, in the second embodiment of the invention threads 96 are provided at an end portion of the bore 80 in plate 78. Referring to FIGS. 8–10, especially FIG. 10, in the third embodiment of the invention threads 126 are provided at an end portion of the bore 102.

In accordance with the invention, means for securing the plate to the first member are provided.

Referring to the first embodiment, shown in FIGS. 1–4, the securing means includes a pin 72 that fixes plate 56 to a first member 74.

In the second embodiment, shown in FIGS. 5–7, the securing means includes a pin 81 that fixes plate 78 to a first member (not shown).

In the third embodiment, shown in FIGS. 8–10, the securing means includes a pin 106 that fixes plate 98 to a first member 110.

In accordance with the invention, retaining means are movably mounted on the plate means for at times retaining the bolt against rotation relative to the plate means. The retaining means are movable between a first position in engagement with a selected number of facets on the bolt head and a second position out of engagement with the facets.

In the first embodiment of the invention, shown in FIGS. 1–4, the retaining means includes an annular retainer 58 having a multifaceted internal surface 60 with individual facets 62 for retaining facets 38e of bolt head 38c. Preferably, annular retainer 58 includes an outer annular portion 64 and an inner annular portion 66. Outer annular portion 64 includes the internal circumferential surface 60 for engaging facets 38e of bolt 38.

Figure 2:
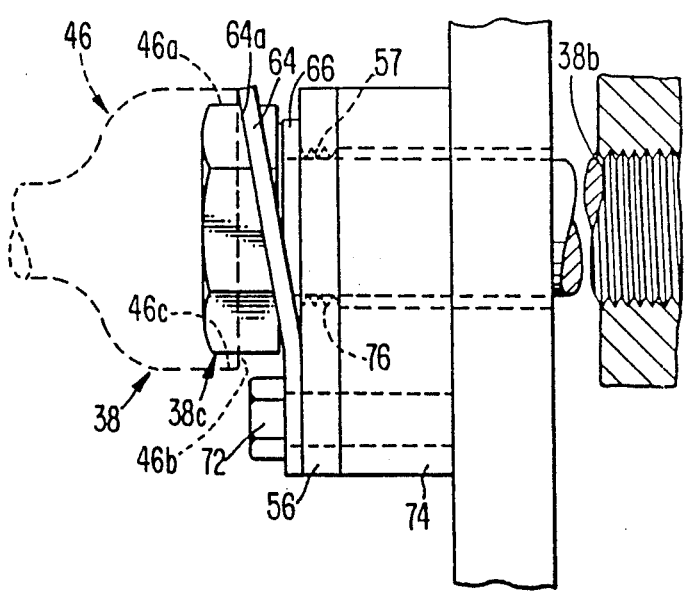
FIG. 2 is a side view of the embodiment of FIG. 1.
Figure 3:
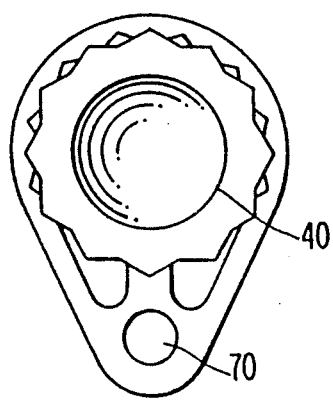
FIG. 3 is a view similar to FIG. 1, illustrating the retention of a twelve facet bolt.
Figure 4:
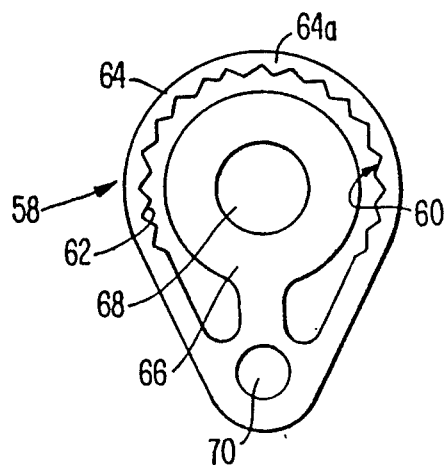
FIG. 4 is a front view of the retaining member of the embodiment of FIGS. 1-3 without a bolt.

Referring to FIG. 2, outer annular portion 64 of the annular retainer 58 is biased outward at an acute angle with respect to inner annular portion 66 in its unstressed condition, or the first position. Preferably, annular retainer 58 is formed from a flexible resilient material having a bias memory which urges outer annular portion 64 to this angular position in the unstressed condition. Preferably, the flexible resilient material is sheet stock which is formed into the retainer 58 using electronic discharge machinery in order to reduce stress at the formed edges of the retainer.

By this configuration, multifaceted inner surface 60 engages facets 38e of bolt 38 in the unstressed condition, which corresponds to the first position, thereby maintaining the bolt in a secured, tightened position. Yet, since outer annular portion 64 is flexible, it may be moved to a second position away from facets 38e of the bolt upon applying a predetermined amount of force.

Referring to FIGS. 5–7, in the second embodiment of the invention the retaining means includes spring biased plungers 84 for engaging a selected number of facets 38e on bolt head 38c. Each spring biased plunger 84 includes a housing 86 containing a spring 87 and a plunger element 88 biased by spring 87 for movement between a first and second position through an aperture 90 in housing 86. Flanges 89 on plunger element 88 engage the circumferential edge of housing 86 adjacent aperture 90 for preventing ejection of plunger element 88 from housing 86 by the force of spring 87.

Spring biased plungers 84 are mounted in bores 92 of plate 78. Preferably, three spring biased plungers 84 are provided adjacent bolt head 38c for engaging a selected number of facets 38e. Providing three spring biased plungers insures that at least two facets 38e of bolt head 38c are engaged by the plunger elements 88 for preventing rotation of bolt 38, even though one spring biased plunger may be pressed axially inward by a facet of the bolt head.

Referring to the third embodiment shown in FIGS. 8–10, the retaining means includes levers 116, 117 for engaging a selected number of facets 38e on bolt head 38c. Levers 116 and 117 are pivotable about axes disposed substantially parallel to bore 102. Levers 116 and 117 are pivotally mounted on plate 98 by pins 118 and 119, respectively.

In accordance with the invention, each of the retaining means includes a surface portion positioned to engage a tool at times when the tool is placed on the bolt head for moving the retaining means from the first position in engagement with facets on the bolt head to the second position out of engagement with the facets on the bolt head. The surface portion remains in engagement with the tool at times when the tool is rotated to adjust the bolt.

Referring to the first embodiment, shown in FIGS. 1–4, the surface portion of the retaining means that receives tool 46 is a flat circumferential edge 64a of outer annular portion 64.

In the second embodiment, shown in FIGS. 5–7, the surface portion of the retaining means that receives tool 46 is an end portion 94 of plunger element 88.

Referring to the third embodiment, shown in FIGS. 8–10, the surface portion of the retaining means that receives tool 46 is a sloped surface 124 and 125 on each of the respective levers 116 and 117.

In accordance with the invention, biasing means are provided to bias the retaining means in the first portion in engagement with the bolt head.

In the first embodiment, shown in FIGS. 1–4, the biasing means is the bias memory of outer annular portion 64.

Referring to the second embodiment, shown in FIGS. 5–7, the biasing means is spring 87 contained in housing 86 of spring biased plunger 84.

Referring to the third embodiment, shown in FIGS. 8–10, the biasing means is a coil spring 120 fixed at one end 120a thereof to a first lever 116 and at another end 120b thereof to a second lever 117. A pin 122 is positioned through the coils of the coil spring 120 for pinning spring 120 to plate 98.

Threads 38b threadably engage the threaded bore in the second member 33a for securing the first member 33 and the second member 33a. Additionally, threads 59 in bore 34 threadably engage the threaded portion 38b of bolt 38 upon insertion and removal of the bolt from bore 34. Threads 59 require the bolt to be rotated in order to bypass cylindrical plate portion 32, thereby preventing the unintentional removal of bolt 38. Thus, when the bolt is loosened to disengage second member 33a, bolt 38 is only slidable within the bore 34 until threads 38b of bolt 38 engage threads 59 of bore 34. The bolt then can not be totally removed from bore 34 without being rotated.

The following is a description of the operation of the first embodiment of the invention. In the first position of the retaining device, shown in FIG. 2, multifaceted internal surface 60 of outer annular portion 64 of retainer 58 engages facets 38e of bolt head 38c. To adjust the bolt, tool 46 (shown in dashed lines in FIG. 2) is placed around bolt head 38c and outer annular portion 64 is pushed inward, toward plate 56 and away from bolt head 38c. Once outer annular retainer 64 is removed from bolt head 38c, the tool may freely rotate the bolt for adjustment thereof. Upon removing the tool, outer annular portion 64 of retainer 58 springs back into engagement with the bolt head, to the position shown in FIG. 2.

Tool 46, shown in dashed lines in FIG. 2, preferably has a circumferential inner surface 46a similar in shape to faceted outer surface 38d of bolt head 38c (or bolt head 40c) in order to surround bolt head 38a. Edge 46b of tool 46 engages the flat surface 64a of outer annular portion 64 when outer annular member 64 is compressed.

Again, internal threads 76 for threadably receiving external threads 38b of bolt 38 require bolt 38 to be rotated in order to bypass plate 56, thereby preventing the unintentional removal of bolt 38. Moreover, threads 38b engage the internally threaded bore of a second member.

The following is a description of the operation of the second embodiment of the invention. Referring to FIGS. 5-7, in the first or unstressed condition, spring plungers 84 are biased axially outward, away from plate 78, by spring 87. The sides 93 of plunger elements 88 engage facets 38e of bolt head 38c. By engaging facets 38e, the bolt head is prevented from rotating and thereby becoming loosened.

To adjust the bolt, tool 46 (shown in dashed lines in FIG. 2) is placed around bolt head 38c. The edge 46b of tool 46 engages the end 94 of plunger elements 88. The pressure of tool 46 compresses spring 87 and pushes the plunger elements 88 back into housing 86, out of engagement with bolt head 38c. Once plunger elements 88 are moved away from bolt head 38c, tool 46 may freely rotate bolt 38 for adjustment thereof. Upon removing tool 46, plunger elements 88 spring back into engagement with facets 38e of bolt head 38c, to the engaging position shown in FIG. 12.

Again, internal threads 96 for threadably engaging external threads 38b of bolt 38 require bolt 38 to be rotated in order to bypass plate 78, thereby preventing the unintentional removal of bolt 38 from the retaining assembly. Additionally, threads 38b engage the internally threaded bore of a second member.

Figure 14:
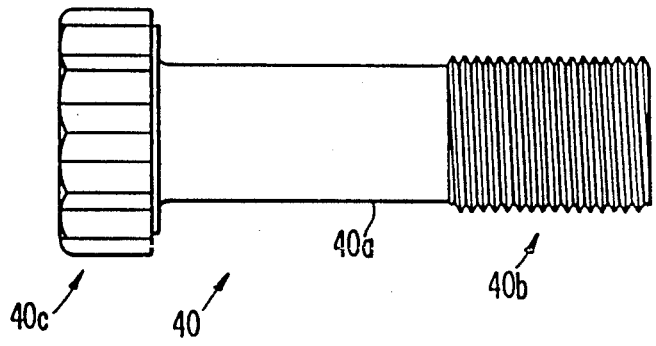
FIG. 14 is a side view of the twelve facet bolt of FIG. 13.
Figure 14:
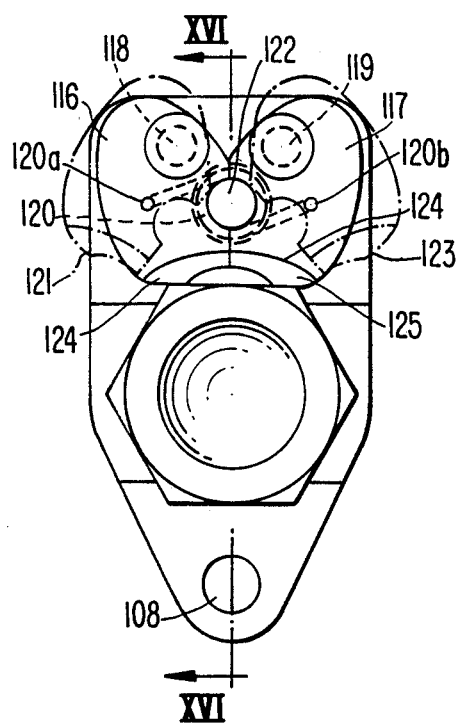
Figure 15:
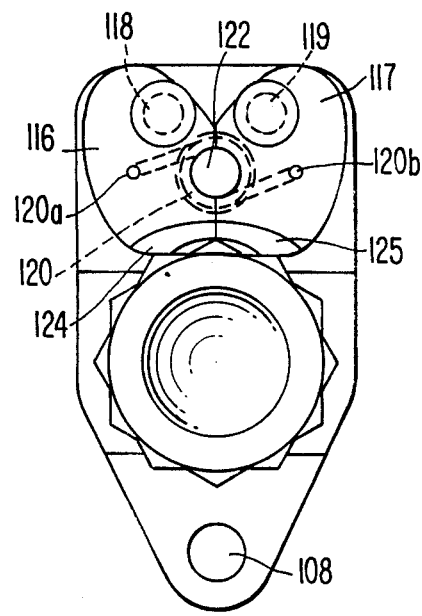
Figure 16:
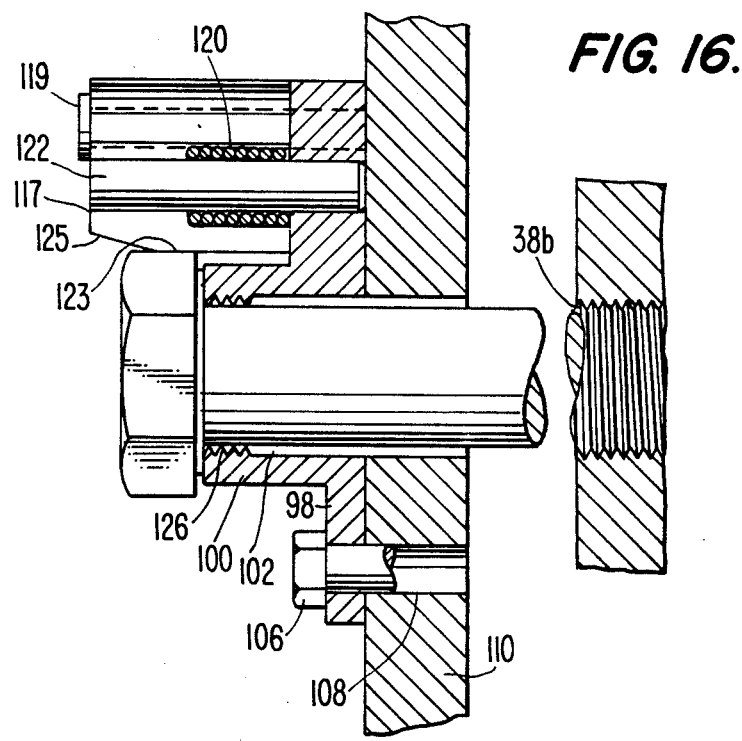
Figure 17:
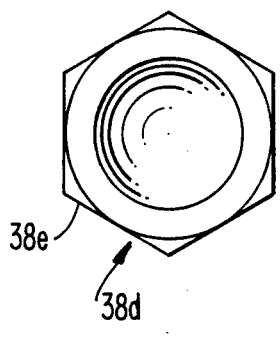
Figure 18:
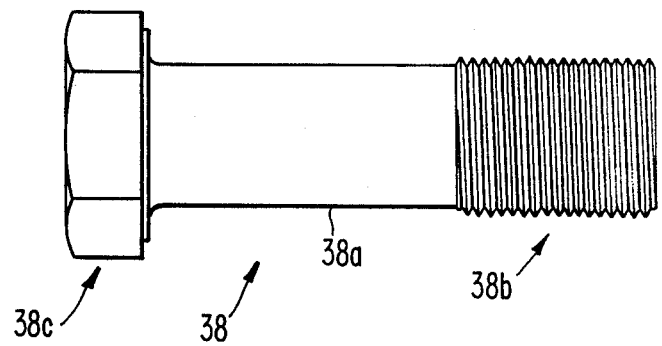
Figure 19:
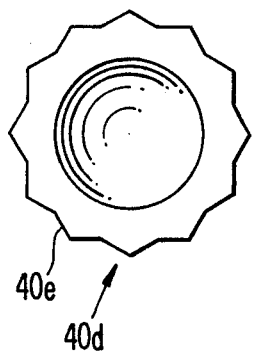
Figure 20:
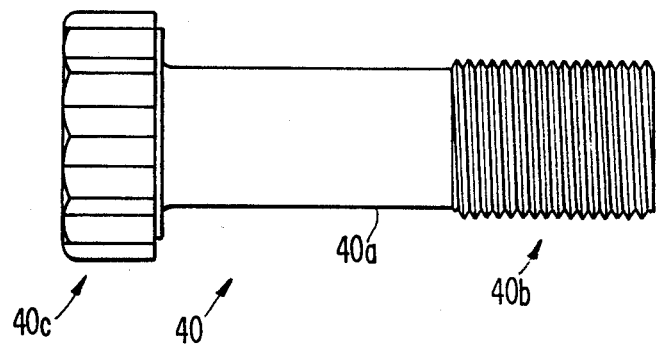

The following is a description of the operation of the third embodiment of the invention, shown in FIGS. 14-16. Referring particularly to FIG. 9, in the first position, levers 116 and 117 are pivoted inward within a plane parallel to plate 98 so that a retaining surface engages a selected number of facets 38e to secure bolt 38 against rotation. In the second position, shown in FIG. 8, levers 116 and 117 are pivoted outward, away from the selected number of facets 38e, to release facets 38e of the bolt head and to permit relative rotation of bolt 38 with respect to plate 98.

Again, cylindrical plate portion 100 preferably has internal threads 126 along its bore 102 for threadably engaging external threads 38b of bolt 38 upon insertion and removal of the bolt from bore 102. These threads 126 require bolt 38 to be rotated in order to bypass cylindrical plate portion 100, thereby preventing the unintentional removal of bolt 38 from the retaining assembly. Additionally, threads 38b engage the internally threaded bore of a second member.

To pivot levers 116, 117 outward to a second position, tool 46 (shown in dashed lines in FIG. 2) is placed around the bolt head 38c. The edge 46a of tool 46 engages sloped surfaces 124, 125 of the levers 116, 117, respectively. The inward movement of the tool 46 along sloped surfaces 124, 125 causes levers 116, 117 to pivot outward against the force of spring 120. Once levers 116, 117 are moved away from the bolt head 38c, tool 46 may freely rotate bolt 38 for adjustment thereof. Upon removing tool 46, levers 116, 117 spring back into engagement with bolt head 38c by the force of spring 120.

It will be apparent to those skilled in the art that various modifications and variations can be made in the construction of these retaining mechanisms without departing from the scope of spirit of the invention. For example, in the preferred embodiment of FIGS. 5-7, a variable number of spring plungers may be distributed at variable points around the circumference of a bolt head, depending on the requirements for a particular application of the retaining mechanism. Moreover, it should be clear that the retaining device of the invention is adapted to be used with any type of bolt. Six and twelve facet bolts are shown by way of example only.

Other embodiments of the invention will be apparent to the skilled in the art from consideration of the specification and practice of the invention disclosed herein. It is intended that the specification and examples be considered as exemplary only, with a true scope and spirit of the invention being indicated by the following claims.

What is claimed is:

1. A device for releasably retaining a bolt in engaging relationship with first and second members having coaxial bores, said bolt having a multifaceted head and a threaded portion at opposite ends of a shank, the head of said bolt located on a side of first member opposite said second member and disposed for engagement by a tool, the threaded portion of said bolt threadably engaging threads in the bore of said second member, said device comprising:
plate means having a bore therethrough for receiving said bolt, said bore having an internally threaded portion for threadably engaging the threaded portion of said bolt to prevent an unintentional removal of the bolt from the bore of the plate means;
means for rigidly securing said plate means to said first member with said bore of said plate means in coaxial relation with the bores in said first and second members;

retaining means movably mounted on said plate means, said retaining means being movable between a first position in engagement with a selected number of the facets that is less than the total number of facets of the plate for securing said bolt against rotation relative to said plate means and a second position out of engagement with the facets for permitting said relative rotation, said retaining means having a surface portion positioned to engage said tool at times when said tool is placed on said bolt head for moving said retaining means to the second position and at times when said tool is rotated to effect said relative rotation of said bolt; and means for biasing said retaining means to the first position.

2. The device of claim 1, wherein said retaining means includes a plurality of abutting members for engaging said selected number of facets on said bolt head in said first position of said retaining means.

3. The device of claim 2, wherein said retaining means is axially movable with respect to said bore between said first and second positions.

4. The device of claim 3, said plate means having a first side that receives said bolt upon insertion, said first side of said plate means defining a planar surface wherein upper surface of plurality of abutting members are disposed substantially flush with said planar surface at times when said retaining means is in the second position and wherein said abutting members protrude beyond said planar surface in the axial direction to engage said selected number of facets at times when said retaining means is in the first position.

5. The device of claim 4, wherein said retaining means includes an annular member having a multifaceted internal surface for engaging said facets of said bolt head in said first position.

6. The device of claim 3, said plate means having a first side that receives said bolt upon insertion, said first side of said plate means defining a planar surface, wherein said retaining means includes an annular retainer, said annular retainer including an inner annular member disposed parallel to and adjacent said planar surface of said plate means and having an aperture therein for receiving said bolt and an outer annular member having a multifaceted internal surface for engaging said selected number of facets of said bolt head in the first position, said outer annular member being biased at an acute angle with respect to said inner annular member in said first position of said retaining means.

7. The device of claim 6, wherein said outer annular member is made of a resilient material for permitting a pivoting movement of said outer annular member between said first and second positions.

8. The device of claim 4, wherein said retaining means includes spring biased plungers, each of said spring biased plungers including a housing containing a spring and a plunger element biased by said spring for movement through an aperture in said housing, and wherein said plunger elements extend beyond said housing in said first position for engaging said selected number of said facets for securing said bolt against rotation, and wherein said plunger elements are movable against the bias of said springs into said housings to said second position to release said facets for permitting said relative rotation.

9. The device of claim 8, wherein said spring biased plungers are mounted in compartments provided in said plate means.

10. The device of claim 9, wherein three spring biased plungers are provided adjacent said bore for engaging said selected number of facets, said spring plungers being positioned at selected angular positions around said bore to insure the engagement of a preselected number of facets by said spring biased plungers for any orientation of said bolt head.

11. The device of claim 2, wherein said plurality of abutting members are movably disposed on said plate means about axes disposed parallel to the bore of said plate means.

12. The device of claim 11, wherein said plurality of abutting members include retaining surfaces for engaging said facets of said bolt head in said first position.

13. The device of claim 12, wherein said plurality of abutting members includes two levers pivotally mounted on said plate means, and wherein said biasing means includes a spring fixed at opposing ends thereof to respective ones of said levers for urging said levers to said first position in engagement with said facets of said bolt head.

14. The device of claim 13, wherein said surface portion of each of said levers has a sloped configuration for operative engagement by said tool to move said levers to said second position during engagement of said bolt head by said tool.

15. A device for releasably retaining a bolt in engaging relationship with first and second members having coaxial bores, said bolt having a multifaceted head and a threaded portion at opposite ends of a shank, the head of said bolt located an a side of said first member opposite said second member and disposed for engagement by a tool, the threaded portion of said bolt threadably engaging threads in the bore of said second member, said device comprising:

plate means having a bore therethrough for receiving said bolt, said bore having an internally threaded portion for threadably engaging the threaded portion of said bolt to prevent an unintentional removal of the bolt from the bore of the plate means, said plate means having a planar surface disposed in a plane perpendicular to the axis of the bore;

means for rigidly securing said plate means to said first member with said bore of said plate means in coaxial relation with the bores in said first and second members;

an annular retainer mounted on said plate means, said annular retainer including an inner annular member disposed parallel to said planar surface of said plate means and having an aperture therein for receiving said bolt and an outer annular member integrally formed with said inner annular member and flexibly biased at an acute angle with respect to said inner annular member, said outer annular member being movable between a first position in engagement with a selected number of facets that is less than the total number of facets of the bolt head for securing said bolt against rotation relative to said plate means and a second position out of engagement with the facets for permitting said relative rotation, said outer annular member having a surface portion positioned to engage said tool at times when said tool is placed on said bolt head for moving said outer annular member to said second position and at times when said tool is rotated to effect said relative rotation of said bolt.

16. A device for releasably retaining a bolt in engaging relationship with first and second members having coaxial bores, said bolt having a multifaceted head and a threaded portion at opposite ends of a shank, the head of said bolt located on a side of said first member opposite said second member and disposed for engagement by a tool, the threaded portion of said bolt threadably engaging threads in the bore of said second member, said device comprising:

plate means having a bore therethrough for receiving said bolt, said bore having an internally threaded portion for threadably engaging the threaded portion of said bolt to prevent an unintentional removal of the bolt from the bore of the plate means;

means for rigidly securing said plate means to said first member with said bore of said plate means in coaxial relation with the bores in said first and second members;

a plurality of spring biased plungers mounted on said plate means, each of said spring biased plungers including a housing containing a spring and a plunger element biased by said spring for movement through an aperture in said housing, said plunger elements being axially movable between a first position in engagement with a selected number of the facets that is less than the total number of facets of the bolt head for securing the bolt against rotation relative to the plate means and a second position out of engagement with the facets for permitting said relative rotation, each of said plunger elements having a surface portion positioned to engage said tool at times when said tool is placed on said bolt head for moving said plunger elements to said second position and at times when said tool is rotated to effect said relative rotation of said bolt, said springs biasing the plunger elements to the first position.

17. A device for releasably retaining a bolt in engaging relationship with first and second members having coaxial bores, said bolt having a multifaceted head and a threaded portion at opposite ends of a shank, the head of said bolt located on a side of said first member opposite said second member and disposed for engagement by a tool, the threaded portion of said bolt threadably engaging threads in the bore of said second member, said device comprising:

plate means having a bore therethrough for receiving said bolt, said bore having an internally threaded portion for threadably engaging the threaded portion of the bolt to prevent an unintentional removal of the bolt from the bore of the plate means, said plate means having a planar surface disposed in a plane perpendicular to the axis of the bore;

means for rigidly securing said plate means to said first member with said bore of said plate means in coaxial relation with the bores in said first and second members;

levers pivotally mounted on said plate means said levers being movable between a first position in engagement with a selected number of facets that is less than the total number of facets of the bolt head for securing the bolt against rotation relative to the plate means and a second position out of engagement with the facets for permitting said relative rotation, said levers having a sloped surface portion positioned to engage said tool at times when said tool is placed on said bolt head for moving said levers to said second position and at times when said tool is rotated to effect said relative rotation of said bolt; and means for biasing said levers to said first position.

* * * * *

UNITED STATES PATENT AND TRADEMARK OFFICE
CERTIFICATE OF CORRECTION

PATENT NO. : 4,976,576

DATED : December 11, 1990

INVENTOR(S) : BERNARD F. MAHANEY ET AL.

It is certified that error appears in the above-identified patent and that said Letters Patent is hereby corrected as shown below:

Column 7 line 7, change "plate" to --bolt head--.

Column 7, line 29, change "surface" to --surfaces--;

line 29, after "of" insert --said--.

Column 8, line 35, change "an" to --on--.

Column 10, line 23, after "means" insert --,-- (comma).

Signed and Sealed this

Seventh Day of April, 1992

Attest:

HARRY F. MANBECK, JR.

*Attesting Officer*  *Commissioner of Patents and Trademarks*